US006856415B1

(12) United States Patent
Simchik et al.

(10) Patent No.: US 6,856,415 B1
(45) Date of Patent: Feb. 15, 2005

(54) DOCUMENT PRODUCTION SYSTEM FOR CAPTURING WEB PAGE CONTENT

(75) Inventors: Andrew D. Simchik, Rochester, NY (US); Kristinn R. Rzepkowski, Rochester, NY (US); Thomas J. Perry, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/496,722

(22) Filed: Feb. 2, 2000

Related U.S. Application Data

(63) Continuation-in-part of application No. 09/450,801, filed on Nov. 29, 1999.

(51) Int. Cl.[7] .............................................. G06K 15/00
(52) U.S. Cl. ....................................... 358/1.15; 358/1.1
(58) Field of Search ................................. 358/1.1, 1.15, 358/1.18, 403, 537, 578, 540; 715/514, 515, 513, 501.1

(56) References Cited

U.S. PATENT DOCUMENTS 5,917,491 A * 6/1999 Bauersfeld .................. 345/810

FOREIGN PATENT DOCUMENTS

GB          2 328 300 A     2/1999

OTHER PUBLICATIONS

Domel, P., *WebMap: a graphical hypertext navigation tool;* Computer and ISDN System, North Holland Publishing, Amsterdam, NL; vol. 28, No. 1, Dec. 1, 1995, pp. 85–97.

Ayers, et al., *Using Graphic History in Browsing the World Wide Web;* International World Wide Web Journal, Dec. 1, 1995, pp. 451–459.

European Search Report, Application No. EP 00 31 0443; Jan. 8, 2003, The Hague.

* cited by examiner

*Primary Examiner*—Arthur G. Evans
(74) *Attorney, Agent, or Firm*—Fay, Sharpe, Fagan, Minnich & McKee, LLP

(57) ABSTRACT

A method for interactively acquiring a page in a network by providing a user interface element, such as a window, for collecting the page in the network, interactively acquiring the page from the network, and inserting the page in the window. A content acquisition facility resident on a client machine can be employed to generate the window. Further, a URL list can be interactively created by launching a browser, generating another user interface element with a URL collection facility, acquiring the URL corresponding to a selected page in the network during browsing, and inserting the URL in the user interface element to create the URL list. Subsequently, the URL list can be imported into a document. The content associated with the URL can then be dynamically, automatically retrieved and placed in the document.

22 Claims, 8 Drawing Sheets

DOCUMENT PRODUCTION SYSTEM FOR CAPTURING WEB PAGE CONTENT

This application is a continuation-in-part of Ser. No. 09/450,801, filed Nov. 29, 1999.

BACKGROUND OF THE INVENTION

The present invention relates to document production systems, and more particularly relates to printing systems for retrieving and inserting content from a network into a document for subsequent printing by the printing system.

The advent of the 'information super highway' or Internet has rapidly increased awareness and acceptance of the Internet as a resource for acquiring content. Hence, the Internet is rapidly replacing more traditional methods for obtaining information, such as books, journals, newspapers, magazines and even television.

The Internet is typically accessed by the use of a web browser, which provides a graphical user interface on a client machine. The web browser is configured for communicating with one or more web servers. If a user wishes to obtain content from a web page at one of the web servers, the user typically initiates a series of manual steps to capture the web page and then print the web page with a suitable printer. For example, the web browser resident on the client machine can capture a web page, which is typically created using Hypertext Markup Language (HTML), and then converts the page into a page description language (PDL) file representative of the page. The PDL file is generally not a readily viewable file, but rather is intended to be sent to a printer that employs appropriate software and hardware for printing the PDL file. If the user desires to acquire multiple web pages, the user must individually capture each web page, and then forward each page individually to the printer. Each web page may include multiple text and graphic files that must each be processed prior to printing. This is a relatively time consuming and manually intensive task.

Furthermore, since the typical web page generally includes content that is frequently updated, the user may need to access and print the web page contemporaneously with the time of use. More specifically, if a user wishes to acquire the most recent content from a web page, the user typically cannot rely upon a web page printed at a prior date. Consequently, the user may need to access the web page multiple times in order to ensure that the most updated content is retrieved.

The web pages typically cannot be batch processed or collected when in the capture environment (e.g., when browsing). More specifically, web pages generally are only captured individually, and require the use of multiple applications and multiple file conversions to capture a single web page. This task is time consuming and requires returning multiple times to the capture environment in order to acquire multiple pages.

SUMMARY OF THE INVENTION

The present invention provides a method for interactively acquiring a page in a network. The method includes the steps of providing a user interface element, such as a window, for collecting the page in the network, interactively acquiring the page from the network, and inserting the page in the user interface element. A content acquisition facility can be employed to generate the user interface element.

According to one aspect, the method also includes the step of launching a browser for browsing the network. According to another aspect, the method includes the steps of providing a document creation algorithm, and importing the pages in the user interface element into the document creation algorithm. According to one practice, one or more secondary user interface elements can be disposed in the window. The secondary user interface elements can be actuated to insert the page in the window. A production facility can be used to translate the page into an image file representative of the page prior to placement within the window.

According to still another aspect, the method employs a content acquisition facility for interactively capturing a plurality of pages during browsing. The pages are then inserted or placed within the user interface element in an interactive manner through the user interface element. During this interactive capture of web pages, at least the content acquisition facility establishes a capture environment, and the method of the invention acquires the page when in the capture environment without terminating a communication link established between the client machine, which can include the content acquisition facility, and the network. The content acquisition facility can capture multiple web pages when in the capture environment.

According to another aspect, the method includes the steps of capturing a uniform resource locator (URL) corresponding to the page, and placing the URL into a second user interface element to form a URL list. The list can then be placed in a document, which can form part of a print job. When the job is forwarded for printing, the system dynamically, automatically retrieves the page corresponding to the URL in the URL list, and imports content associated with the page into the document. A production facility can be employed to translate the page into an image file corresponding to the page prior to importing the content into the document.

The invention also provides a method for dynamically creating a URL list having one or more uniform resource locators (URLs) associated with one or more pages in a network. The method includes the steps of launching a browser for browsing the network, generating a user interface element with a URL collection facility, acquiring the URL corresponding to a selected page in the network during browsing, and inserting the URL in the user interface element to create the URL list.

According to one aspect, the step of launching the web browser establishes a communication link with the network, and the URL list is assembled without terminating the communication link. Once the list is performed, the URLs in the URL list can be re-ordered or changed.

According to another aspect, the method includes the steps of importing the URL list into a document generated by a document creation algorithm, dynamically and automatically retrieving the page corresponding to the URL in the URL list, and importing content associated with the page into the document. A production facility can be employed to translate the page into an image file corresponding to the page prior to importing the content into the document.

According to still another aspect, the user interface element can be a window that includes one or more secondary user interface elements for inserting the URL into the URL list.

DESCRIPTION OF ILLUSTRATED EMBODIMENT

An integrated printing system that provides for capturing or retrieving content in multiple pages from a network (such as the Internet), and then converting the content in the pages into a format suitable for integration with a document generated by a document creation algorithm. As used herein, the term document creation algorithm is intended to include any application program, script or function for creating or displaying a document. The pages can be captured in batch form in a single capture session if desired, for subsequent conversion and importation into the document. The present invention further provides for capturing and inserting multiple links or page addresses in the document, and then later dynamically and automatically retrieving content corresponding to those links for integration in the document.

Figure 1:
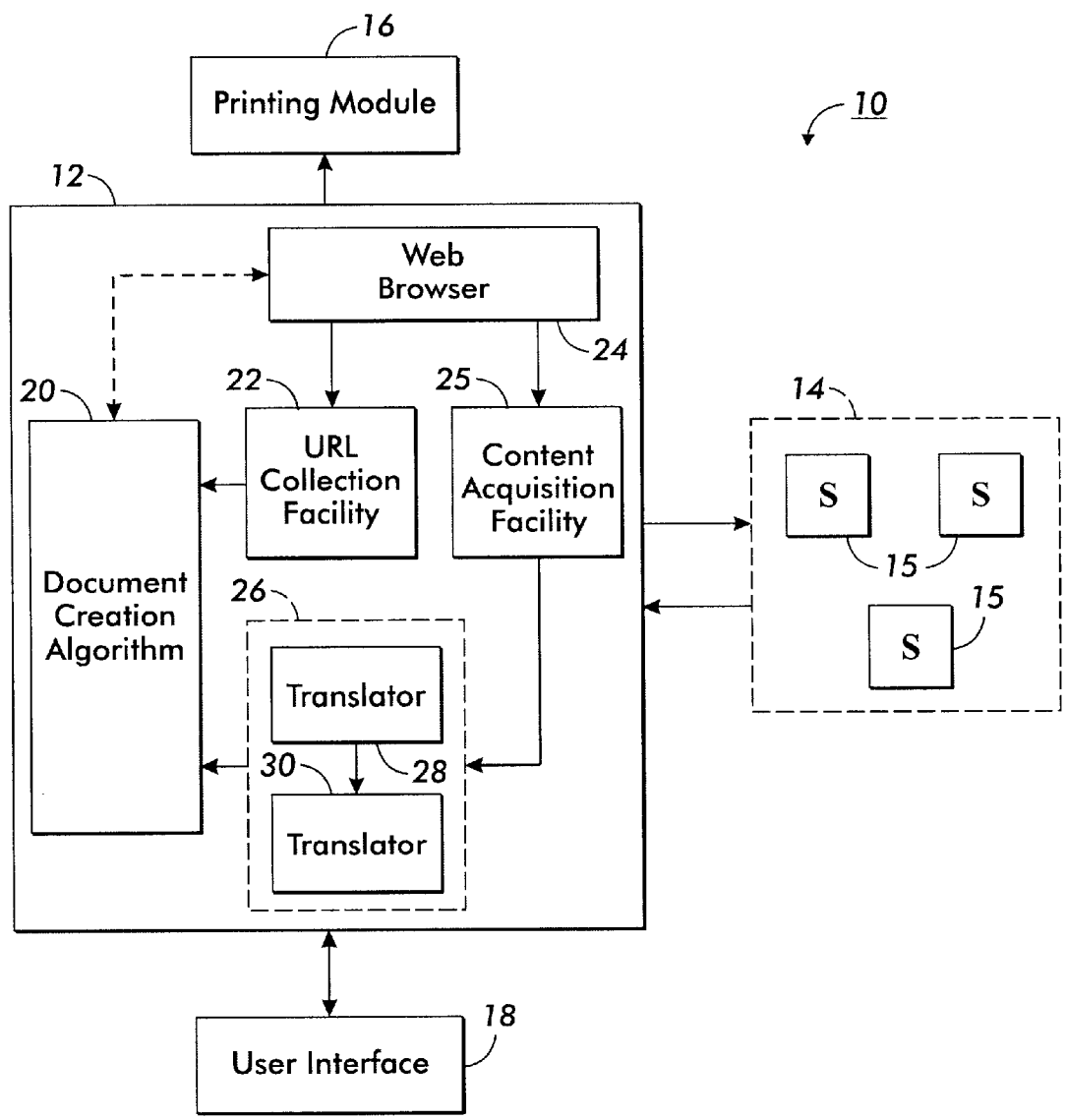
FIG. 1 is a schematic block diagram of a networked printing system according to the teachings of the present invention.

FIG. 1 illustrates a printing system 10 that includes a client machine 12 coupled to a network 14 and to a printing module 16 by any suitable connection. The illustrated client machine 12 can be any IBM compatible personal computer or similar computing apparatus that can be coupled in a network configuration with the network 14, and coupled via any suitable communication link, such as a network link, to the printing module 16. The client machine 12 can also form part of an additional network, which in turn communicates with the network 14. The client machine 12 can further contain various forms of hardware and software according to known distributed processing techniques. The client machine can also be a pager, cellular telephone, personal data assistant (PDA), and the like.

The illustrated network 14 can employ one or more servers, schematically illustrated as servers 15, that are disposed in communication with each other in selected network configuration. The servers 15 can be arranged in any conventional manner which would be obvious to those of ordinary skill in the art. The network 14 can be coupled with the client machine 12 to form an overall network, such as a LAN or a WAN, and preferably is configured in a specialty client-server relationship called the Internet. For purposes of clarity, we refer below to the network 14 as the web 14, the servers 15 as the web servers 15, and the network page as a web page. Those of ordinary skill in the art will readily recognize that the teachings of the invention also apply to all forms of networks, including but not limited to intranets, extranets, IP networks, and the like.

The illustrated client machine 12 can communicate with the web 14 utilizing known functionalities, such as the functionality provided by the hypertext transfer protocol (HTTP). The web 14 includes web servers 15 that all support the TCP/IP protocol suite, and which are addressable to client machines via universal resource locators (URLs). In a conventional web connection, the illustrated client machine 12 employs a browser, such as the web browser 24, which establishes the connection with the web 14 to present information to a system user through the user interface 18. The web servers 15 in the web 14 execute corresponding server software which presents information to the client machine 12 in the form of HTTP responses or packets. The HTTP responses correspond to web pages constructed from a Hypertext Markup Language (HTML), or other server-generated data.

A page designed to be accessed over the web is called a web page. A web page can include any selected content, such as media content including text, graphics, images, and even multi-media objects such as sound recordings or moving video clips, as well as executable content such as software code. In conventional systems, a web page if it contains content of multiple types is usually constructed by loading several separate files, such as a hypertext file, a graphic image file or a sound file. For example, in conventional systems, the client machine 12 will receive the web page from the web 14 in the form of multiple files, each file containing different content. Each web page has a unique address formatted as a URL. When the client machine 12 forwards a request to the web 14 for a web page, the web 14 transmits the web page, which may include multiple files forwarded separately, to the client machine 12. The web browser 24 communicates with the web 14 over a communication link, which can typically be a local area network connection, a wide area connection, a connection over telephone lines, a wireless connection, cable connection, and the like, or a combination thereof.

The illustrated printing module 16 can be any image reproduction system, examples of which include electrophotographic, electrostatic, ionographic, and other types of image forming or reproduction systems, which are adapted to capture, store and/or reproduce image data associated with a particular object, such as a document. The system of the present invention is intended to be implemented in a variety of environments, such as in any of the foregoing types of image reproduction systems, and are intended to include any of the DocuTech T series of printers from Xerox Corporation.

With reference to FIG. 1, the illustrated client machine 12 includes a document creation algorithm 20, which can be any software application or algorithm adapted or configured to assemble or create a document having selected content, such as text or images. Examples of suitable document creation algorithms suitable for use with the present invention include the DigiPath suite of software manufactured and sold by Xerox Corporation, and more particularly the Document Scan and Makeready application which forms part of the DigiPath software suite. Other types of document creation or assembly applications suitable for use with the present invention include Adobe Acrobat 4.0, as well as other software which can be employed to create documents suitable for display by the illustrated client machine 12, or suitable for creation and forwarding to the printing module 16 for printing.

The illustrated document creation algorithm 20 is in communication with a URL collection facility 22. The URL collection facility 22 is adapted to collect or create a listing of network links (e.g., addresses corresponding to web pages) which can be inserted into a document created by the document creation algorithm 20. The URL collection facility 22 is an optional component and is schematically illustrated as being separate from the web browser 24, the content acquisition stage 25, and the production facility 26. Those of ordinary skill in the art will readily recognize that the URL collection facility can form part of any of the components or facilities contained in the client machine, or can be located remote from the client machine 12.

The illustrated URL collection facility 22 communicates with the web browser 24, which is commercially available and is intended to include but is not limited to Netscape Navigator™, NCSA Mosaic, and Internet Explorer™. The illustrated web browser 24 further communicates with a content acquisition facility 25 for capturing or acquiring multiple web pages. The content acquisition facility 25 in turn is in communication with the production agent or facility 26, which can include one or more translator facilities such as translator facilities 28 and 30. The translator facilities 28 and are intended to translate or interpret the web pages captured by the content acquisition facility 25 from the web 14, as described below. The production facility 26 communicates with a display and/or a keyboard, schematically illustrated as the user interface 18.

Figure 2:
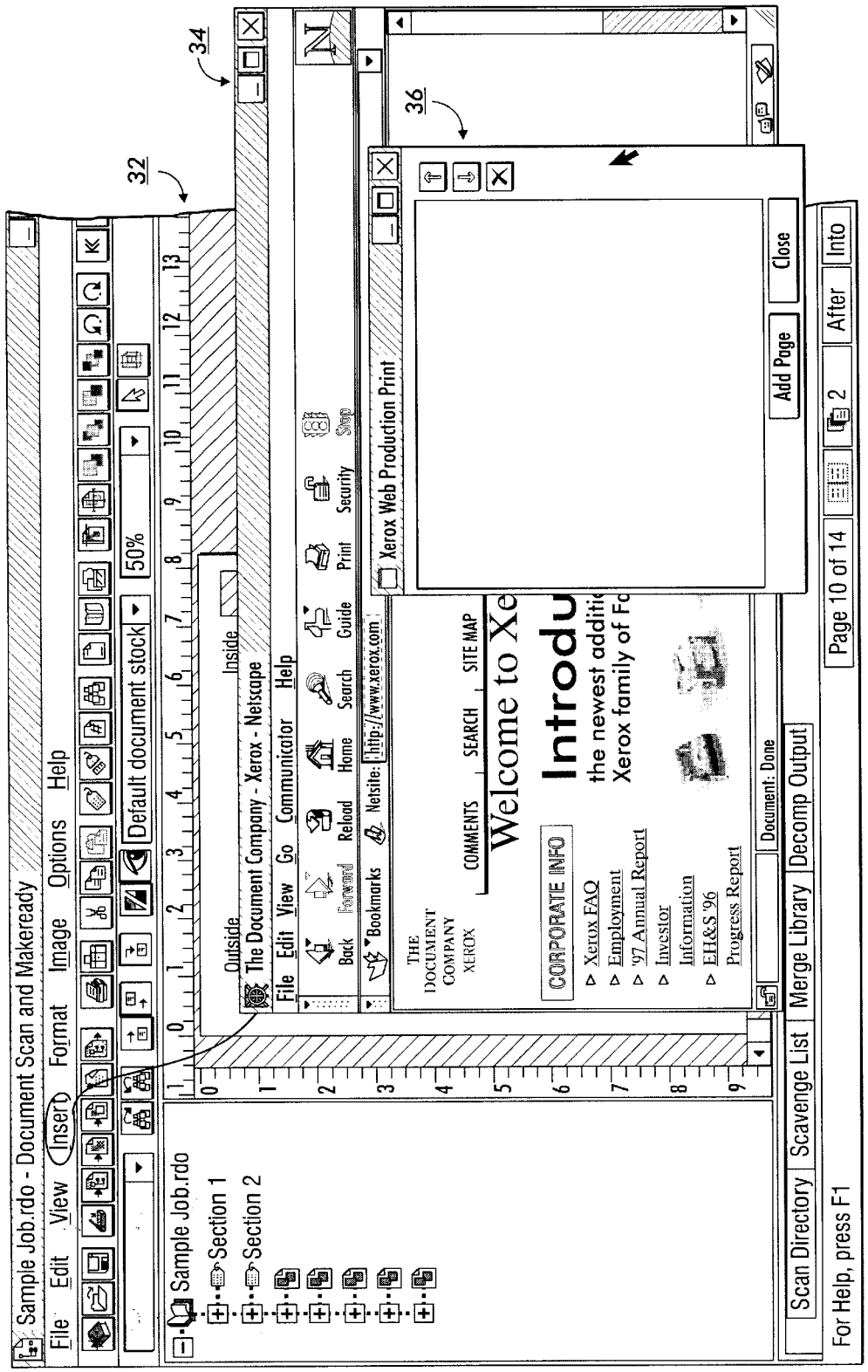
FIGS. 2 and 3 are schematic illustrations of exemplary user interface elements corresponding to the content acquisition facility of FIG. 1 in accordance with the teachings of the present invention.
Figure 3:
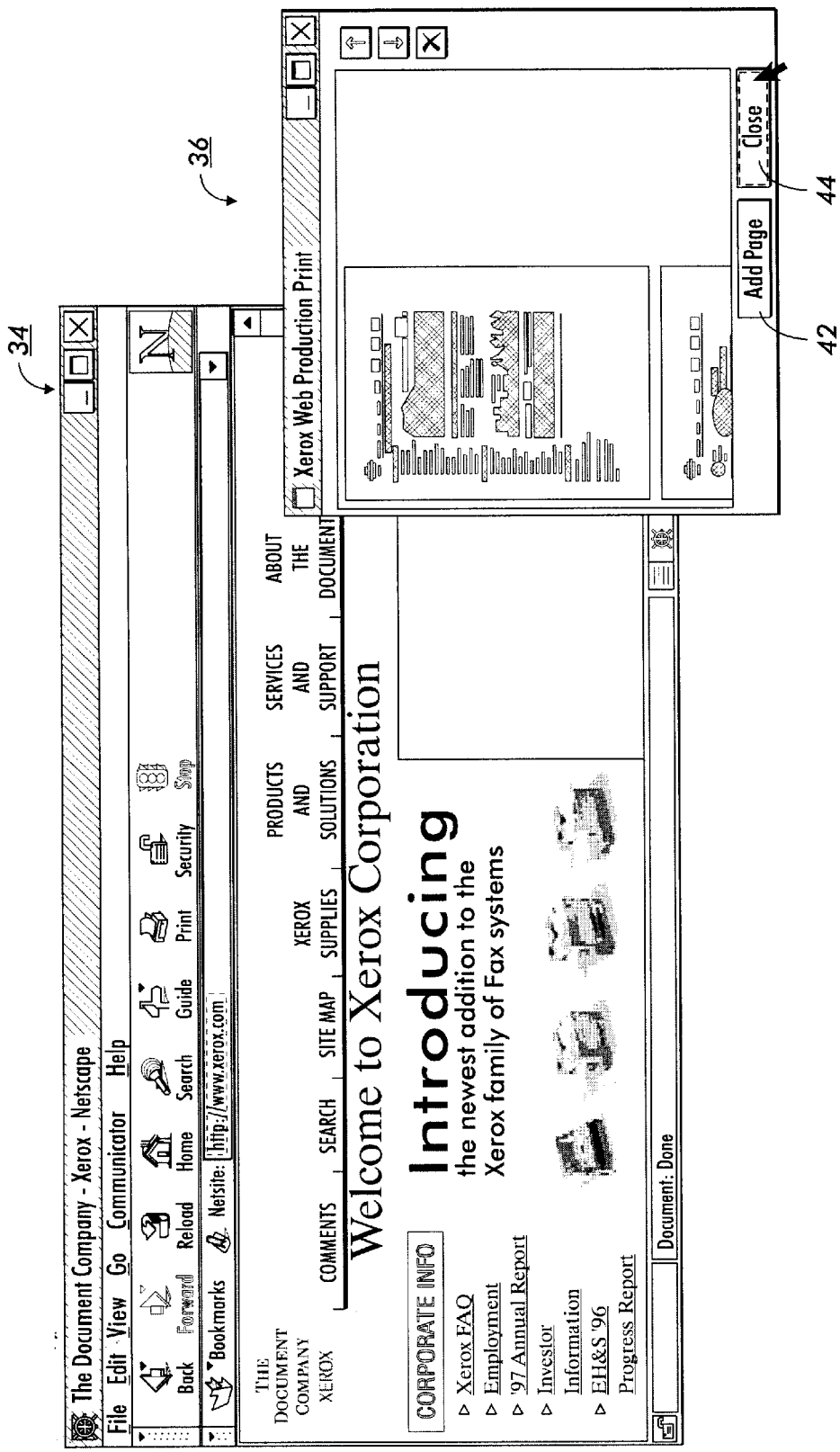
Figure 4:
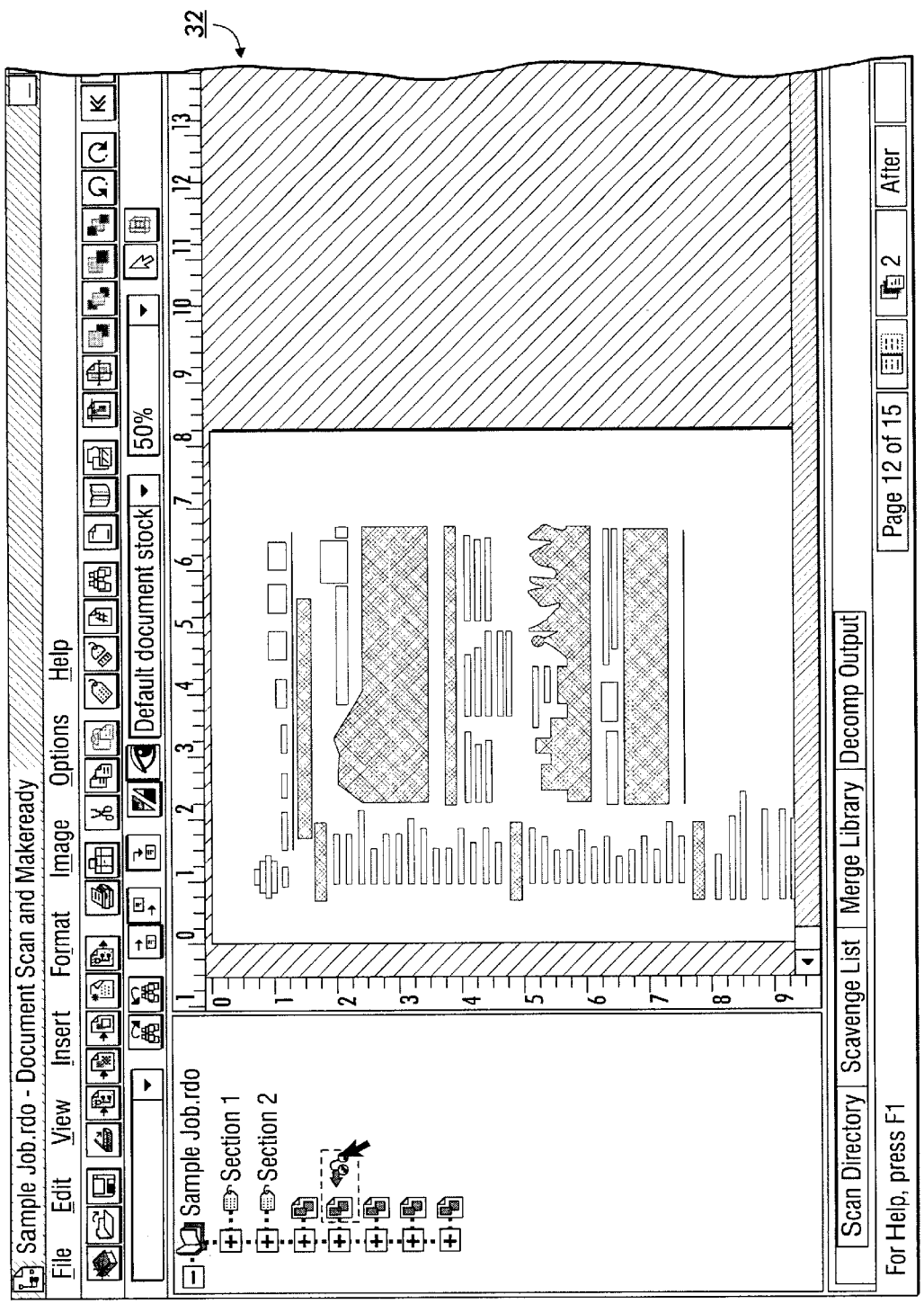
FIG. 4 is a schematic illustration of an exemplary user interface element corresponding to a document generated by the document creation algorithm of FIG. 1 in accordance with the teachings of the present invention.

FIGS. 2 through 4 show user interface elements employed by the client machine 12 when collecting web pages for assembly into a document created by the document creation algorithm 20 according to the teachings of the present invention. The system user can employ the present invention to capture web page content. With reference to FIG. 2, the user can create or assemble a document with the document creation algorithm, such as the Document Scan and Makeready application portion of the DigiPath software suite, and then from this algorithm generate a user interface element or window 32. The window 32 illustrates the formation of a document 40. The window 32 can be displayed on the user interface 18. When assembling the document, the user can employ the content acquisition facility 25 to acquire content from a web page, or acquire a list of URLs with the URL collection facility 22, for placement within the document 40. According to one practice, if the user desires to acquire web page content, the client machine 12 runs or launches the web browser 24, which creates a user interface element or window 34 on the user interface 18. The content acquisition facility 22, which can be configured as a plug-in for the web browser 24, generates the preview window 36 for collecting web pages.

The client machine 12 launches the web browser 24, which in turn sends a user request to one of the web servers 15 of the web 14. In particular, the web browser 24 employs a URL which defines a particular address of a web page on one of the web servers 15. The URL is a standard way of referencing a particular object on the web 14. It was primarily developed to address the need to have a uniform method for locating various files and data objects on the Internet. A URL has a defined format, which typically includes method://host/path, where the method is the protocol used to access the data body, the host is the fully qualified host name of the web server containing the data, and the path is any method specific data used to determine which data object on the web server is being referenced. Hence, the web browser 24 by employing the URL can point to a file in a particular directory located on a particular web server in the web 14. The web 14 then returns a web page to the client machine 12. The web browser 24 can be adapted to receive the web page, which typically is encoded in HTML. The web browser 24 evaluates the HTML data (content) associated with the web page to determine if there are any hyper-link statements in the HTML data which would require subsequent browser requests, which would then be initiated by the web browser 24. The web browser 24 then transfers the web page to the content acquisition facility 22 for placement within the preview or collection window 36.

With reference to FIG. 3, after the user selects a web page, a user interface element or button 42 can be actuated or 'clicked' with a control instrument, such as a mouse, to capture and place an image of the web page in the preview window 36. The content acquisition facility 22 can generate a thumbnail image of each selected web page and place the image within the window. The user then selects another web page, and inserts the second web page image into the preview window. The user repeats the process as many times as necessary to collect multiple web pages and associated content. The user can end or terminate the capture or browsing session from the capture environment (e.g., preview window 36) by actuating the close button 44 in the preview window 36. The close button 44 terminates or ends the web page capture session.

The content acquisition facility 22 in connection with the production facility 26 can capture the web page in a format suitable for editing and printing. Moreover, the thumbnail images of each web page can be reordered, or a selected image removed from the window 36. Hence, the preview window 36 affords the system user the ability to manipulate the images to create a selected image order and number for insertion into the document 40. The re-ordering of the web pages and the deletion and/or addition of web pages can be performed without leaving the capture environment or session afforded by the preview window 36 and the web browser 24, and without the need for running or executing several different applications to collect the web pages.

The captured web pages placed within the preview window 36 or web pages to be captured by the content acquisition facility 25 can be batch processed by the production facility 26 to convert the web pages into image files for importation or placement within the document 40 generated by the document creation algorithm 20. The illustrated production facility 26 can employ a first translator 28 that converts the HTML data associated with the web page into a page description language (PDL) file representative of the web page. For example, the translator 28 can employ Postscript® from Adobe Systems to translate or convert the web page into the PDL file. Those of ordinary skill will also recognize that other types of page description languages can be employed to convert HTML data associated with the web page into a PDL file. Examples of such language types include Envoy, PDF, and PCL. An example of a PDF format language suitable for use with the present invention includes Adobe Acrobat 4.0 from Adobe Systems. In conventional client-server configurations, the translated PDL file is generally directly transferred to a printer, such as the printing module 16, which can contain appropriate software and hardware drivers for converting the PDL file to an appropriate format for printing. Hence, the PDL file is generally not employed or incorporated into a document.

According to the present invention, the production facility 26 includes a second translator 30 for translating the PDL file into an image file containing image data representative of the web page. The translator 30 can automatically translate the PDL file into an image file representative of the captured web pages, which is capable of being directly imported into the document 40 generated by the document creation algorithm 20. Furthermore, the production facility 26 and the document creation algorithm 20 can be tightly integrated such that the image file generated by the translator is directly integrated into the document. Those of ordinary skill will readily recognize that the first translator 28 can form part of the web browser 24 and that the production facility 26 can be configured as a plug-in for the web browser 24. The image file generated by the production facility 26 can be a Tagged Image File Format (TIFF) file, JPEG file, or any other human readable file.

The image file generated by the production facility 26 can be displayed by the user interface 18, or directly imported into the document generated by the document creation algorithm 20. For example, with reference to FIG. 4, the web pages within the preview window 36 and translated by the production facility 26 are imported into the document 40 in any suitable form, such as a page 38 for insertion therein. Once the document is completed by the document creation algorithm, the document can be forwarded directly to the printing module 16 for subsequent printing. Alternatively, the translated web pages can be stored in a file for later use.

Figure 5:
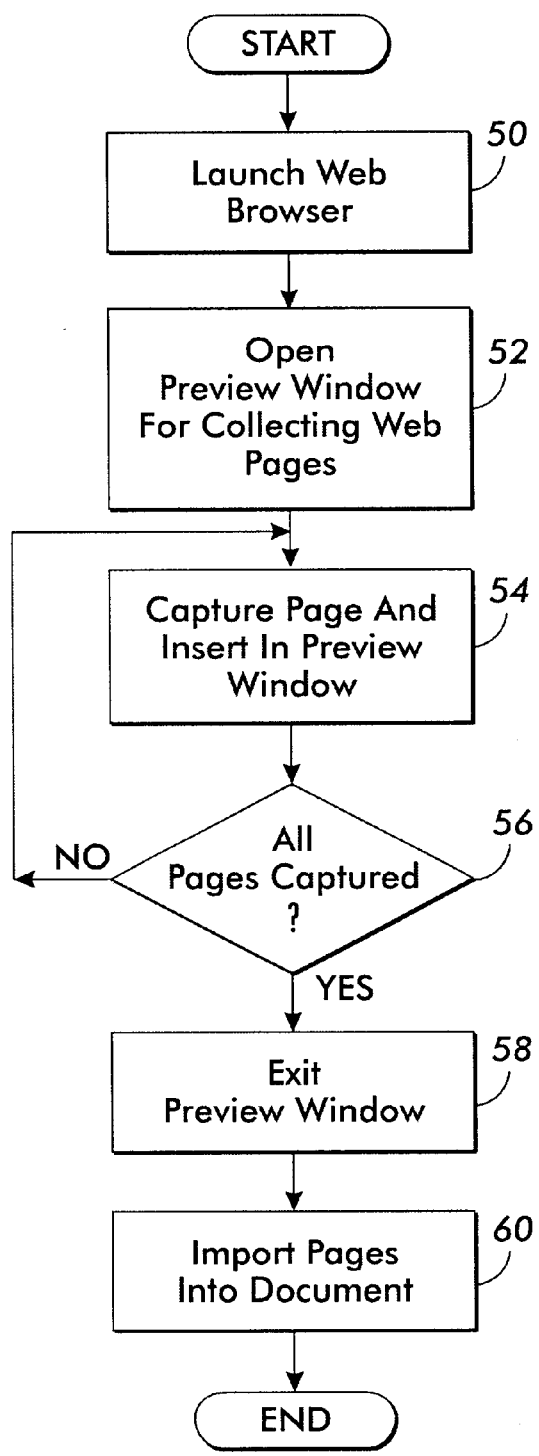
FIG. 5 is a schematic flow-chart diagram illustrating the operation of the image reproduction system of FIG. 1 for capturing multiple web pages in the capture environment.

In operation, the web browser 24, the content acquisition facility 22 and/or the production agent 26 can be employed to retrieve a web page, place the web page within a preview window 36, and then insert the web page into a document. With reference to FIG. 5, the user creates a document with the document creation algorithm, and then launches a web browser (step 50) to locate or select a web page. The web browser 24 can employ a URL to access a web page in the web 14, which in turn retrieves the web page and transfers the web page to the web browser 24. The content acquisition facility 22 then launches or generates the preview or collection window 36 (step 52) for collecting one or more web pages. The content acquisition facility 22 receives the pages from the web browser and inserts the web page in the window by clicking the add page button 42 (step 54). Prior to inserting the page in the window 36, the production facility 26 translates the web page into an image file (thumbnail image) that is then displayed in the window. If the user desires to insert additional web pages in the window 36 to create a selected job, then the user browses to another page, and then inserts the page in the window 36 (step 54). The user proceeds to insert web pages until all selected content is captured. The web pages can be inserted into the window 36 in the form of uneditable thumbnails, which are images of the entire web page. The user then terminates or ends the capture session by clicking the close button 44 to close the window. The web pages can then be imported into the document generated by the document creation algorithm 20 (step 60) at a defined location.

The user can then create a print job via the user interface 18 and forward the job (which contains the document) to the printing module 16. The printing module 16 then prints the document. The image file created by the production agent 26 is of the type that can be directly displayed by the user interface in human readable form, or can be incorporated directly into the document created by the document creation algorithm 20 for subsequent editing, altering and printing.

A significant advantage of the content acquisition facility 22 of the present invention is that the facility can capture multiple web pages in a single interactive capture session without necessitating switching between multiple applications. Hence, the user can interactively capture multiple web pages while browsing. The ability to capture multiple pages in a single interactive environment reduces the time associated with capturing content in the web pages (reduced time on task) and then placing the content in a document. Rather, all desired pages can first be captured in the window 36, and then the collection of pages can be imported directly into the document. This methodology avoids the need for capturing a single page, attempting to import content associated with the single page into a document or into another application, and then repeating the entire process.

Another significant advantage of the present invention is that the pages need not necessarily be web pages. Instead, the network can be some other network, and the page can be configured in a different file format, such as PDF and the like.

The present invention further provides for the collecting, assembling, or constructing a list of page addresses or URLs (e.g., links) in an interactive, dynamic manner, without leaving the capture environment. Specifically, the present invention provides for the ability to insert one or more links into a document created by the document creation algorithm 20. The links inserted into the document provide for the automatic and dynamic updating, retrieval, and implementation of data for incorporation into a document created by the document creation algorithm. Hence, a user need not manually update a document with content contained on a page, such as a web page, of a network, where the content is dynamically changing. According to the present invention, the user need only provide the link within the document corresponding to the address or location of the page containing the content. The user can collect or assemble the URLs while browsing by simply actuating one or more simple user interface elements during the capture or collection process. The collection of URLs will be described below in connection with FIGS. 1 and 6–8.

Figure 6:
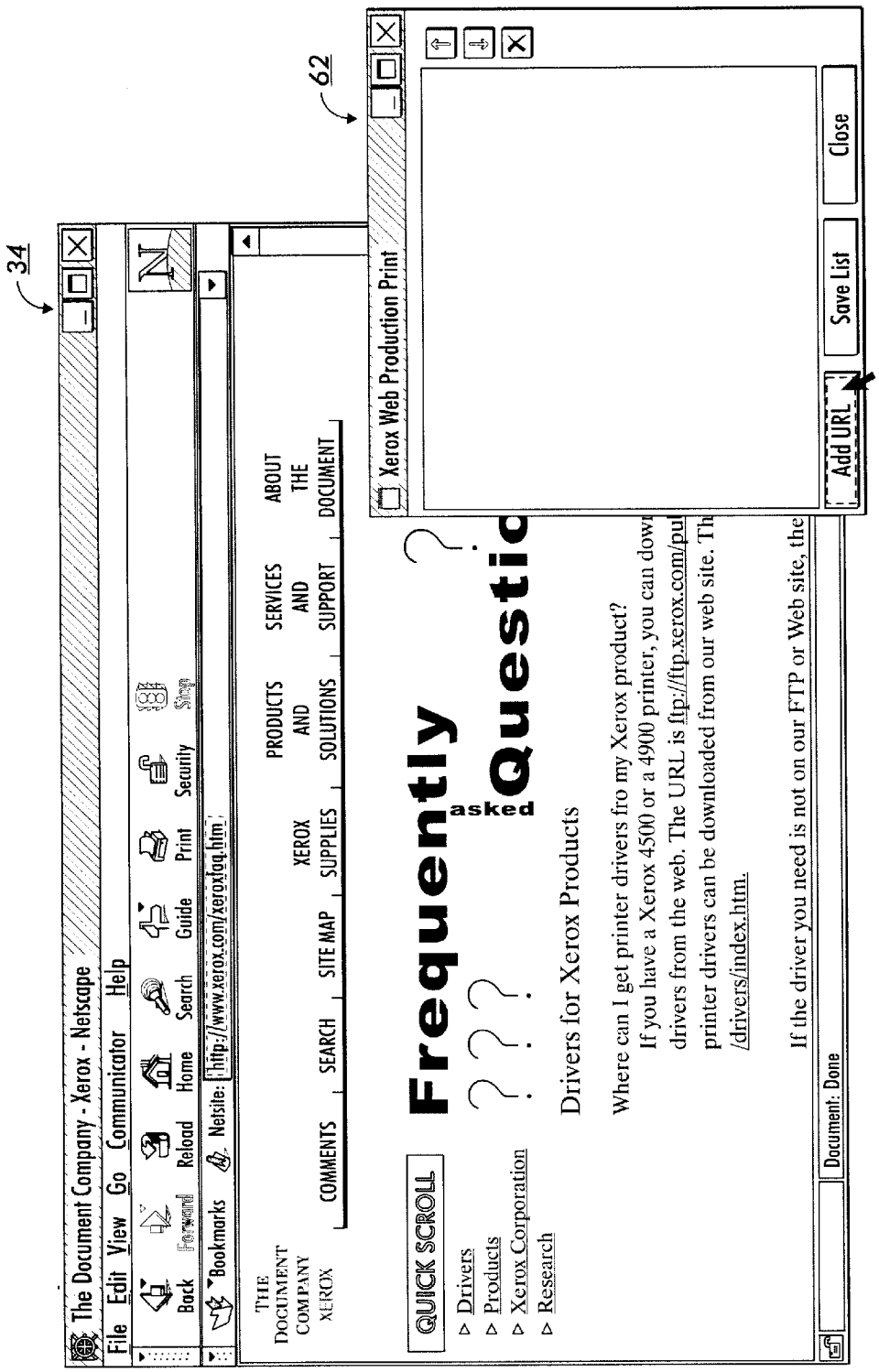
FIGS. 6 and 7 are schematic illustrations of exemplary user interface elements corresponding to the URL collection facility of FIG. 1 in accordance with the teachings of the present invention.
Figure 7:
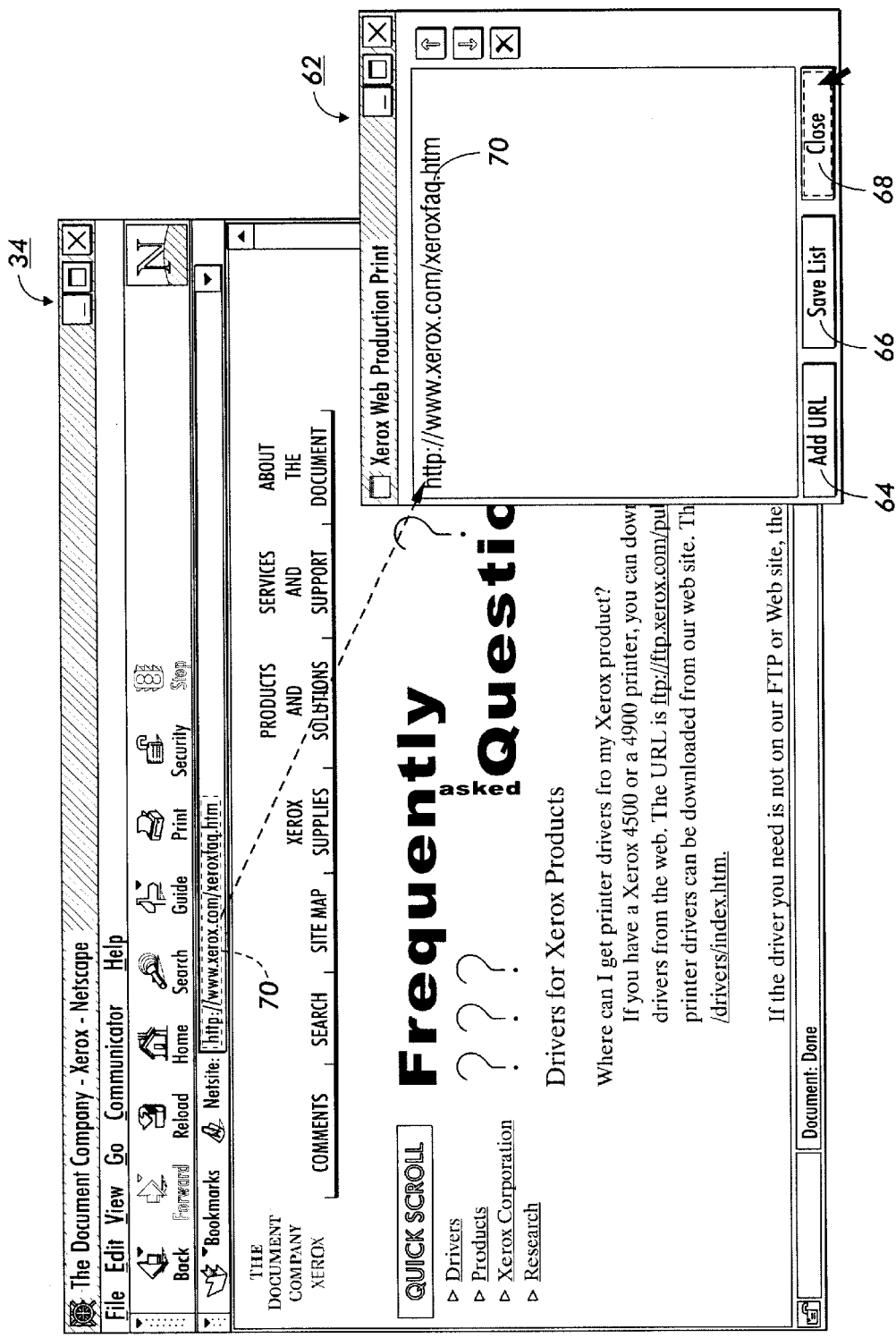
Figure 8:
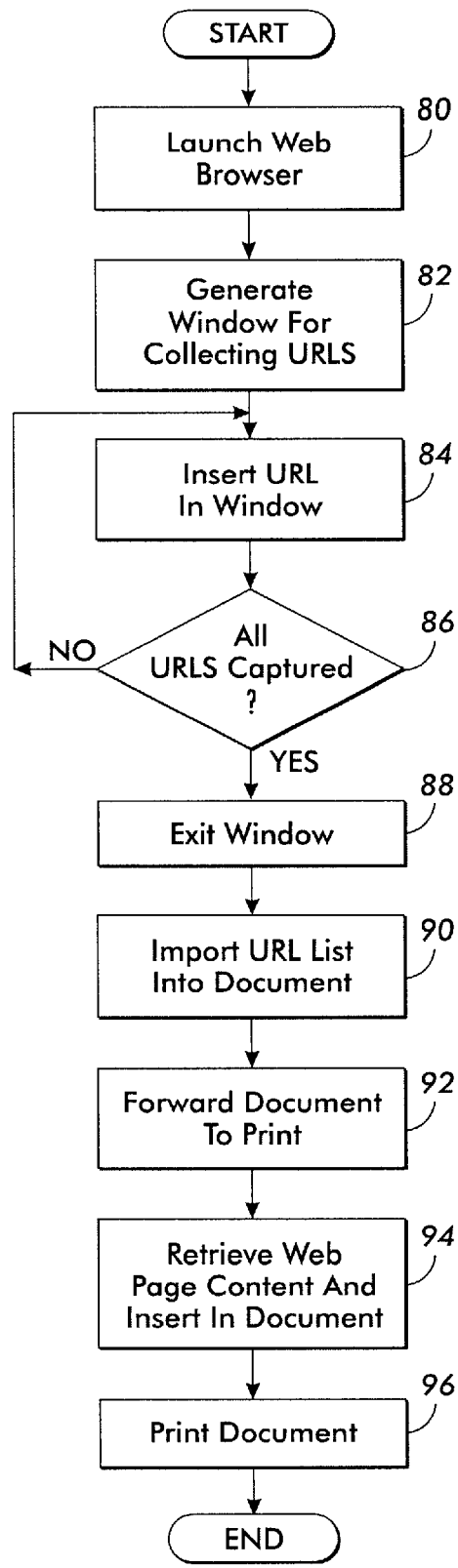
FIG. 8 is a schematic flow-chart diagram illustrating the operation of the printing system of FIG. 1 for collecting a number of URLs and for inserting the URLs in a document in accordance with the teachings of the present invention.

With reference to FIG. 1, the system user through the user interface 18 can initiate the collection of URLs by launching the web browser 24. The web browser operates in connection with the URL collection facility 22 which can be configured as a plug-in for the browser. FIGS. 6 and 7 show exemplary user interface elements or windows that can be employed to collect the URLs according to the teachings of the present invention. Specifically, the client machine 12 can launch the web browser 24. The web browser can create the window 34, and the collection facility can create the window 62. The window 34 is a typical web browser window. The window 62 can include one or more user interface elements that are configured as buttons. According to one practice, the window 62 can employ three buttons, including the add URL button 64, the save list button 66, and the close button 68. Those of ordinary skill will readily recognize that any number and arrangement of user interface elements can be employed.

The user can access the appropriate site or page on the web 14, and then capture or collect the address or URL. The URL 70 can be collected and assembled into a list by actuating or clicking the add URL button 64. Once actuated, the URL collection facility 22 inserts or places the URL 70 into the window 62, as illustrated. The URL collection facility further stores information about the displayed fragments in order to later reconstruct pages called from index frames. The user can then access another page in the web 14, and if a desired URL is located, can be added to the list by actuating the add URL button 64. The user can assemble a list of URLs by locating the appropriate web page, and then employing the URL collection facility 22 to insert the URL into an interactive window 62. The user can hence construct the URL list while working within the browser or capture environment.

The user can manipulate the URLs 70 in the list to perform a number of selected functions. For example, the user can reorder the URL list in the window 62, or can add or delete entries in the URL list as desired.

When the user finishes assembling the list, the user can save the URL list by actuating the save list button 66. The URL collection facility 22 can either save the list by importing the list directly into a document created by the document creation algorithm 20, or can save the list directly to memory in the client machine or at some other location. Once saved, the list can be later imported into the document by accessing the list in memory. The user may also close or terminate the window 62 by actuating the close button 68.

The URL collection facility 22 is employed to assemble a URL list, which can then be imported into the document. The document with the inserted URL links can then be forwarded to the printing module 16 for printing. However, prior to printing, the system 10 launches the web browser 24, dynamically and automatically retrieves the web page corresponding to the URL, and then converts the web page with the production facility 26 into an image file. The image file is then inserted into the document. The illustrated image reproduction system 10 allows a user to insert a URL indicative of a selected web page into a document. By doing so, the user ensures that at the time of printing, the most updated content in the web page can be automatically captured and inserted into the document. This contemporaneous capture of web page content allows the user to dynamically, automatically insert updated or changing web page content into a document when most needed, that is, at the time of printing. The capture and insertion of the web page content into the document is dynamic since a URL list can be created by the URL collection facility 22 and inserted into the document, and then at the time of printing the system automatically retrieves the web page content associated with the URL without requiring the user to retrieve each web page, separate or independent of the printing process, and then inserting some of the content, if possible, into the document.

In operation, the user can create or generate a URL list containing one or more URLs by entering selected commands into the user interface to initiate the URL collection process. Initially, the user can launch the web browser either from the document creation algorithm or separately therefrom. The web browser 24 is launched (step 80), and the user identifies or accesses a selected web page in the web 14 using the browse window 34. Simultaneously, the URL collection facility 22, which can be configured as a plug-in for the web browser 24, generates or launches a URL collection window 62 (step 82). The collection window 62 employs buttons 64-68 that enable the user to collect or assemble the URL list. For example, the user accesses a selected web page in the web 14, and then actuates the add URL button 64 in the window 62. The URL collection facility 22 then inserts the URL corresponding to the web page into the window 62 (84). The user then accesses another web page with the web browser 24, and then adds another URL to the list in the window 62. The user repeats this process until the list is complete (step 86). The user can then save the URL list by importing the list directly into the document generated by the document creation algorithm 20, or can save the URL list into a selected file (steps 88 and 90). The user can then complete the document or job, and then forward the job to the printing module for printing (step 92).

When the job is forwarded for printing, the promoting system 10 dynamically and automatically retrieves the web page content associated with the URL and imports this content into the document. For example, the system launches the web browser 24 and retrieves the web page corresponding to the URL. The web page is then converted into an image file by the production facility 26, and then inserted into the document (step 94). The document, which now contains content associated with the web page, is printed by the printing module 16 (step 96).

The URL collection facility 22 generates and/or inserts a URL list into a document in order to allow content from a web page associated with the URL to be incorporated into the document at the appropriate time. For example, the URL collection facility 22 provides for the ability to create a URL list and then insert this list into a document to ensure that updated web page content corresponding to the URL is provided at the appropriate time. This methodology provides for an easy to use system for dynamically inserting content from the web 14 into a document.

A significant advantage of the present invention is that it provides for the ability to interactively create a URL list without terminating or interrupting the browsing activity of the web browser 24. The URL list can then be imported into a document. The system then dynamically and automatically retrieves the web page content associated with the URL list at the time of printing, or at any other appropriate time. It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. In a printing system a method for interactively acquiring a content of multiple pages in a network while browsing the network, said method comprising the steps of launching a browser for browsing the network, providing a user interface element for collecting the content of the pages in the network while browsing the network, interactively acquiring the content of the pages from the network, and inserting the content of the pages in said user interface element.

2. The method of claim 1, further comprising the steps of providing a document creation algorithm for creating a document, and importing the content of the pages in said user interface element into said document.

3. The method of claim 1, further comprising the step of providing a content acquisition facility for generating said user interface element.

4. The method of claim 3, wherein said user interface element includes a window, further comprising the steps of launching a browser for browsing the network, providing one or more secondary user interface elements in said window, and actuating one of said secondary user interface elements to insert the content of said pages in said window.

5. The method of claim 1, further comprising the step of translating the content of said pages into image files representative of the content of said pages with a production facility prior to placement within said user interface element.

6. The method of claim 1, further comprising the steps of launching a browser for browsing the network, and interactively capturing content from a plurality of pages during browsing for placement in said user interface element in an interactive manner through one of said web browser and said user interface element.

7. The method of claim 1, further comprising the step of establishing a communication link between a client machine and the network, and wherein said step of acquiring the content of the pages comprises the steps of establishing a capture environment, and acquiring the content of the pages when in said capture environment without terminating said communication link and without having to switch between multiple applications.

8. The method of claim 1, wherein each page is a web page, further comprising the steps of capturing a uniform resource locator (URL) corresponding to each web page, and placing said URL into a second user interface element to form a URL list.

9. The method of claim 8, further comprising the steps of generating a document with a document creation algorithm, and placing said URL list in said second user interface element into the document.

10. The method of claim 8, further comprising the step of reordering said URLs in said URL list.

11. The method of claim 8, further comprising the steps of importing said URL list into a document, dynamically retrieving each web page corresponding to each one of said URLs in said URL list, and importing content associated with each web page into the document.

12. The method of claim 11, further comprising the step of translating the content of each web page into an image file corresponding to the content of each web page.

13. In a printing system, a method for dynamically creating a URL list by collecting uniform resource locators (URLs) associated with the pages in a network while browsing the network, comprising the steps of a) launching a browser for browsing the network, b) generating a user interface element with a URL collection facility, c) acquiring each URL corresponding to the content of each selected page in the network during browsing, and d) inserting each URL in said user interface element to create the URL list.

14. The method of claim 13, further comprising the steps of repeating steps c) and d) until said URL list is completed.

15. The method of claim 13, wherein said step of launching said web browser establishes a communication link with said network, and wherein said steps c) and d) are performed without terminating said communication link.

16. The method of claim 13, further comprising the step of re-ordering said URLs in said URL list.

17. The method of claim 13, further comprising the steps of importing said URL list into a document generated by a document creation algorithm, dynamically, automatically retrieving the content of said page corresponding to each of said URLs in said URL list, and translating the content of said page into an image file corresponding to the content of said page, importing the content associated with the each page into the document.

18. The method of claim 13, further comprising the steps of providing one or more secondary user interface elements in said user interface element.

19. The method of claim 18, wherein the secondary interface elements are configured as buttons.

20. The method of claim 19, wherein said buttons are configured for adding a URL to, deleting a URL from and saving said URL list.

21. A printing system for interactively acquiring content of a page in a network while browsing the network, comprising a browser for browsing the network, a content acquisition facility for generating a user interface element, a production facility for translating the content of the pages into image files representative of the content of the pages and integrating the image files into a document created by a document creation algorithm.

22. The printing system of claim 21, wherein said user interface element collects the content of one or more pages in the network for display to the user.

* * * * *